MICROPHONE FEED CIRCUIT

Filed Jan. 14, 1966

INVENTOR.
JOHN M GODFREY
BY
[signature]
ATTORNEY

United States Patent Office 3,508,016
Patented Apr. 21, 1970

3,508,016

MICROPHONE FEED CIRCUIT

John M. Godfrey, West Acton, Mass., assignor to International Telephone and Telegraph Corporation, a corporation of Delaware Filed Feb. 14, 1966, Ser. No. 527,352
Int. Cl. H04r 21/02
U.S. Cl. 179—122 2 Claims

ABSTRACT OF THE DISCLOSURE

Means are provided for compensating for changes in the resistance of a microphone due to aging or environmental changes. Transistor circuits are used to maintain power output at a level value and thereby assure constant current as resistance varies.

This invention relates to telephone microphones and more particularly to circuits for maintaining a constant current feed into such microphones.

Conventional telephone microphones use carbon granules as a transducer element for converting sound waves into electrical currents. When they are manufactured, the granules usually have a resistance in the order of about forty ohms. As they age, change position, are subjected to shock, etc., the resistance changes to perhaps sixty ohms or more.

Usually these variations in carbon granule resistance are not material. The twenty ohms or so variation are very slight as compared with the six hundred ohms or so in a conventional telephone line. Thus, in the past, little has been done to compensate for the changes.

On the other hand, these changes may become sources of trouble if they are used in certain evironments. For example, a subscriber carrier system has terminals remotely located many miles from the nearest source of power. It would be very expensive to run power lines to these remote locations. Moreover, the space is usually limited at these remote locations so that bulky power supply equipment cannot be used conveniently.

Therefore, the convention is to hold at a minimum the resistances powered from these remote locations. When such low level resistances are used, the variations in microphone resistance are not swamped out. Quite the contrary, the microphone becomes the most important source of current drain so that the demands on the power supply fluctuate wildly.

Accordingly, an object of this invention is to provide new and improved means for feeding power into a microphone. A more specific object is to provide means for maintaining a constant current in a carbon granule microphone. A further object is to provide a microphone power feed circuit in a subscriber carrier system.

In keeping with one aspect of this invention, a constant current generator is placed in the microphone circuit. This generator includes a pair of transistors coupled in parallel and cross wired so that they adjust each other's operating point. One transistor is part of a circuit supplying current to the microphone. The other transistor is part of a circuit which, in effect, monitors current changes. The current in the power feed system divides between these two transistor circuits in a predictable manner. If the current through the monitoring transistor rises, a bias change ocurs so that the current is lowered through the transistor supplying the microphone. If the current through the monitoring transistor lowers, a bias change occurs so that the curent is raised through the transistor supplying the microphone. In this manner, the output power from the microphone is prevented from dropping as the microphone resistance increases.

The above mentioned and other features and objects of this invention and the manner of obtaining them will become more apparent, and the invention itself will be best understood by making reference to the following description of an embodiment of the invention taken in conjunction with the accompanying drawings wherein.

Figure 1:
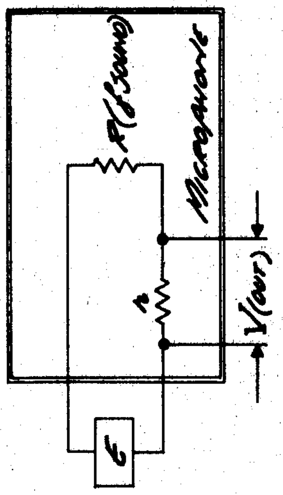
FIG. 1 is a block diagram showing an equivalent circuit for a conventional microphone feed circuit.

As shown in FIG. 1, the usual power feed circuit may be reduced to a battery E in series with a microphone and a load. An equivalent circuit for the microphone is an equivalent resistor R ($f$ sound) which varies as a function of sound.

The useful signal or voltage out is the voltage generated by the IR drop across the resistance $r$. The problems caused by change in the microphone resistance may become more apparent from a study of two loop equations for FIG. 1, one equation for the microphone and power supply in an original state ($R_1$), and another equation for the microphone ($R_2$) and power supply after the effective carbon granule resistance has doubled ($R_2=2R_1$).

Applying Ohm's law to the circuit:

$$i_{(\text{out})_1}=\frac{E}{R(f\text{ sound})+r}$$

and $$V_{(\text{out})_1}=\frac{rE}{R_1(f\text{ sound})+r}$$

Since power varies as the product of current voltage and a power factor (which in this case is essentially unity):

$$P_{(\text{out})_1}=\frac{rE^2}{[R_1(f\text{ sound})+r]^2} \quad (1)$$

where:

$i_{(\text{out})_1}$=current in the loop E, R ($f$ sound), $r$ before microphone resistance changes, $V_{(\text{out})_1}$=the voltage drop across $r$ before microphone resistance changes, and $P_{(\text{out})_1}$=the output power before microphone resistance changes.

If the effective microphone resistance changes to $R_2$, the output power changes to $$P_{(\text{out})_2}=\frac{rE^2}{[R_2(f\text{ sound})+r]^2} \quad (2)$$

If $R_2=2R_1$, as assumed, and if $R_1=1$ and $r=1$; then solving Equation 1 for $E^2$ and substituting that solution for $E^2$ in Equation 2, we have $$P_{(\text{out})_2}=P_{(\text{out})_1}=\left(\frac{R_1(f\text{ sound})+r}{R_2(f\text{ sound})+r}\right)=\frac{4}{9}P_{(\text{out})_1} \quad (3)$$

This solution shows, by Equation 3 that, in the usual circuits the microphone power output is reduced to less than one-half, if the microphone resistance doubles.

Figure 2:
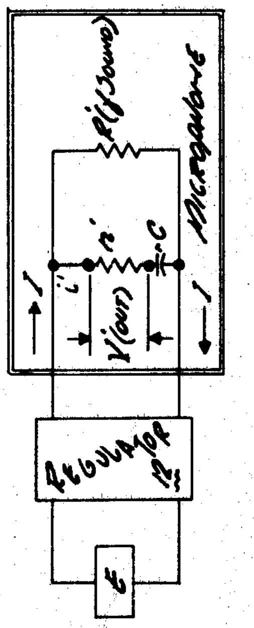
FIG. 2 is a block diagram which shows the principles of the invention.

The principle of the invention involves a restructuring (as shown in FIG. 2) of the equivalent circuit block diagram (FIG. 1) so that the microphone produces no less than a predetermined power output regardless of the changes in microphone resistance. As there shown, the load resistance $r'$ is in parallel with the microphone resistance R′ which varies as a function of sound. The output current $i_{(\text{out})}$ is the current which flows through the resistor $r'$. The power source E feeds R′ through a "regulator" circuit of any convenient design.

From the well known equation for the voltage drop across parallel resistances, the output voltage $V'_{(out)}$ is $$V'_{(out)}=\frac{Ir'R'(f\text{ sound})}{r'+R'(f\text{ sound})} \quad (4)$$

where I=the total current through the two parallel resistances.

From Ohm's law, ignoring the effects of any phase shift, we know that $$i'_{(out)}=\frac{V'_{(out)}}{r'}$$

Therefore, $$i'_{(out)}=\frac{IR'(f\text{ sound})}{r'+R'(f\text{ sound})} \quad (5)$$

The output power is obtained by multiplying the output voltage (Equation 4) by the output current (Equation 5).

$$P'_{(out)_1}=r'\left[\frac{IR'(f\text{ sound})}{r'+R'(f\text{ sound})}\right]^2 \quad (6)$$

With the same assumption used above that the effective microphone resistance $R'_2$ doubles over a period of time, $R'_2R'_2=2R_1'$; the output power after the change in microphone resistance is $$P'_{(out)_2}=[P'_{(out)_1}]\left[\frac{R'_2(f\text{ sound})}{R'_1(f\text{ sound})}\cdot\frac{r'+R'_1(f\text{ sound})}{r'+R'_2(f\text{ sound})}\right]^2 \quad (7)$$

assuming that $$r'=1$$
$$R'_1\ (f\text{ sound})=1$$
$$R'_2\ (f\text{ sound})=2$$

Equation 7 gives the value $$P'_{(out)_2}=(P'_{(out)_1})\cdot\frac{16}{9}$$

From this, it is seen that the output power of the microphone increases in the FIG. 2 equivalent circuit as the DC resistance of the microphone increases. Thus, the microphone tends to increase its efficiency as the resistance increases. Consequently, if the total current I is adjusted for optimum performance when a new microphone is installed, the efficiency of the microphone increases with aging.

Figure 3:
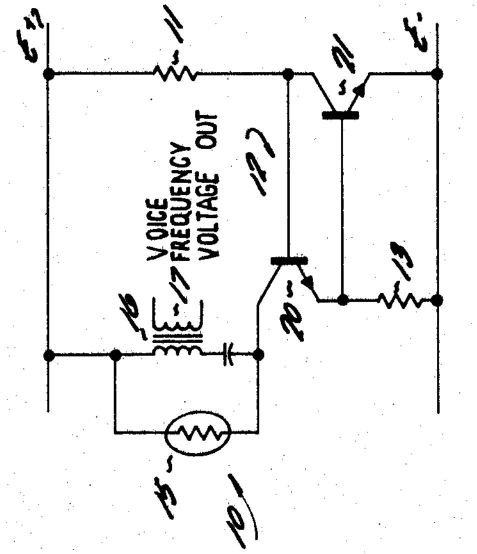
FIG. 3 is a schematic circuit diagram showing how the regulator operates.

FIG. 3 shows a circuit for providing the operation described in FIG. 2. The major parts of this circuit are the output of a power supply E+ and E−, a microphone and an output circuit 10, a biasing and load resistor 11, a control switch or regulator 12, and a biasing and current limiting resistor 13. The microphone circuit includes a carbon granule capsule 15 in parallel with the primary winding 16 of an output transformer. The secondary winding 17 of the output transformer couples to a useful load circuit.

The electronic switch 12 includes two NPN transistors, each in common emitter configuration. One transistor 20 controls the current through the microphone capsule 15 (resistor R' (*f* sound) of FIG. 2). The other transistor 21 controls the current through resistor 11. The base elements of each of these transistors is cross connected to the emitter-collector circuit of the other transistor. Therefore, the output of each transistor varies as a function of the current through the other transistor.

The power feed circuit operates this way. Current flows from the source E+ through the carbon granule capsule 15, the transistor 20 and resistor 13 to the source E−.

The current causes an IR drop across resistor 13 which is applied to the base of the transistor 21 to provide a threshold bias to the base of the transistor 21. As the current increases through the transistor 20, the IR drop across resistor 13 goes up, and the base of the transistor 21 becomes more positive. As the base of transistor 21 becomes more positive, it becomes harder to apply the negative E− potential to the base of the transistor 20. This, in turn, reduces the current through the resistor 13 and makes the base of the transistor 21 more negative.

Upon reflection, it should be apparent that the two transistors 20, 21 respond to changes in circuit conditions to adjust each other to the operating point which was predetermined by the circuit designer who assigned the circuit values. Those values are preferably selected so that the transistor 21 is normally "on" and conducting at the lowest reliable level at which the microphone will operate.

The emitter-base voltage of a transistor is well defined and almost completely independent of changes in a very small current drawn by the base. Thus, the potential drop across resistor 13 is almost constant. Since the effect of resistor 13 is large as compared with the resistance of the carbon granule microphone 15, the current through the microphone is constant for all practical purposes, and the voltage across the microphone will increase as the carbon resistance increases. The output power is the product of the applied voltage and the current. Thus the output power will increase as the capsule resistance increases.

While the principles of the invention have been described above in connection with specific apparatus and application, it is understood that this description is made only by way of example and not as a limitation on the scope of the invention.

What is claimed is:

1. In a telephone station a microphone, a source of power for feeding electrical energy to said microphone, said microphone having a carbon granule capsule the resistance of which may change as a function of environmental and aging factors, means including two transistors for maintaining a constant current through said microphone regardless of changes in resistance in the carbon granule capsule, an output transformer having a primary winding connected across the terminals of said carbon granule capsule, means connecting the terminals of said carbon granule capsule and the primary winding of the output transformer in parallel with each other and in series with the emitter-collector circuit of a first transistor to form a first series circuit, means connecting a resistor in series with the emitter-collector circuit of a second transistor to form a second series circuit, means connecting said two series circuits across said source of power and in parallel to each other whereby current from said source of power divides between said two series paths, and means for cross connecting said two transistors to adjust each others operating point, the means for cross connecting including means for connecting the emitter of the first transistor to the base of the second transistor and means for connecting the collector of the second transistor to the base of the first transistor, whereby the output power of said microphone is made to vary in direct proportion to changes in the resistance of the microphone.

2. A telephone station as claimed in claim 1, in which the output transformer includes a secondary winding for connection to terminals of a telephone line.

References Cited

UNITED STATES PATENTS

| | | | |
|---|---|---|---|
| 1,682,443 | 8/1928 | Thomas | 179—1 |
| 2,991,407 | 7/1961 | Murphy | 323—4 |
| 3,235,775 | 2/1966 | Winston | 323—4 X |
| 3,246,233 | 4/1966 | Herz | 323—4 |

RALPH D. BLAKESLEE, Primary Examiner

U.S. Cl. X.R.

323—4